United States Patent [19]

Foggini

[11] Patent Number: 4,694,530
[45] Date of Patent: Sep. 22, 1987

[54] DEVICE FOR CONTROLLING OPENING AND CLOSING OF MOVABLE OBJECTS, IN PARTICULAR DOORS AND DRAWERS IN MOTOR VEHICLES, HAVING MUTUALLY COOPERATING STATOR AND ROTOR

[75] Inventor: Paolo Foggini, Revigliasco Torinese, Italy

[73] Assignee: Foggini Progetti S.r.l., Beinasco To, Italy

[21] Appl. No.: 851,575

[22] Filed: Apr. 14, 1986

[30] Foreign Application Priority Data

Apr. 24, 1985 [IT] Italy .............................. 53304/85[U]

[51] Int. Cl.⁴ ............................................... E05F 5/02
[52] U.S. Cl. .................................. 16/82; 16/DIG. 17; 188/290
[58] Field of Search .................. 16/49, 60, 62, 64, 66, 16/69, 79, 82, 84, DIG. 9, DIG. 10, DIG. 17; 188/290

[56] References Cited

U.S. PATENT DOCUMENTS

| 2,024,472 | 12/1935 | Norton | 16/62 X |
| 4,485,522 | 12/1984 | Chen | 16/DIG. 9 X |
| 4,502,180 | 3/1985 | Harrison et al. | 16/62 X |
| 4,527,675 | 7/1985 | Omata et al. | 16/82 X |

Primary Examiner—Fred Silverberg
Attorney, Agent, or Firm—Guido Modiano; Albert Josif

[57] ABSTRACT

The device comprises a rotor having a central pin a plurality of concentrically arranged cylinders and a sprocket wheel, adapted for mesh engagement with a rack fixed to the sidewall of a drawer compartment. The device also comprises a stator adapted for being attached to a drawer and rotatably mounted on the pin and having a plurality of concentrically arranged cylinders interposed between those of the rotor. Relative movement of the rotor and the stator is controlled by an arrangement of co-operating grooves, a cam, and a ball, and a high density fluid interposed between the cylinders.

4 Claims, 7 Drawing Figures

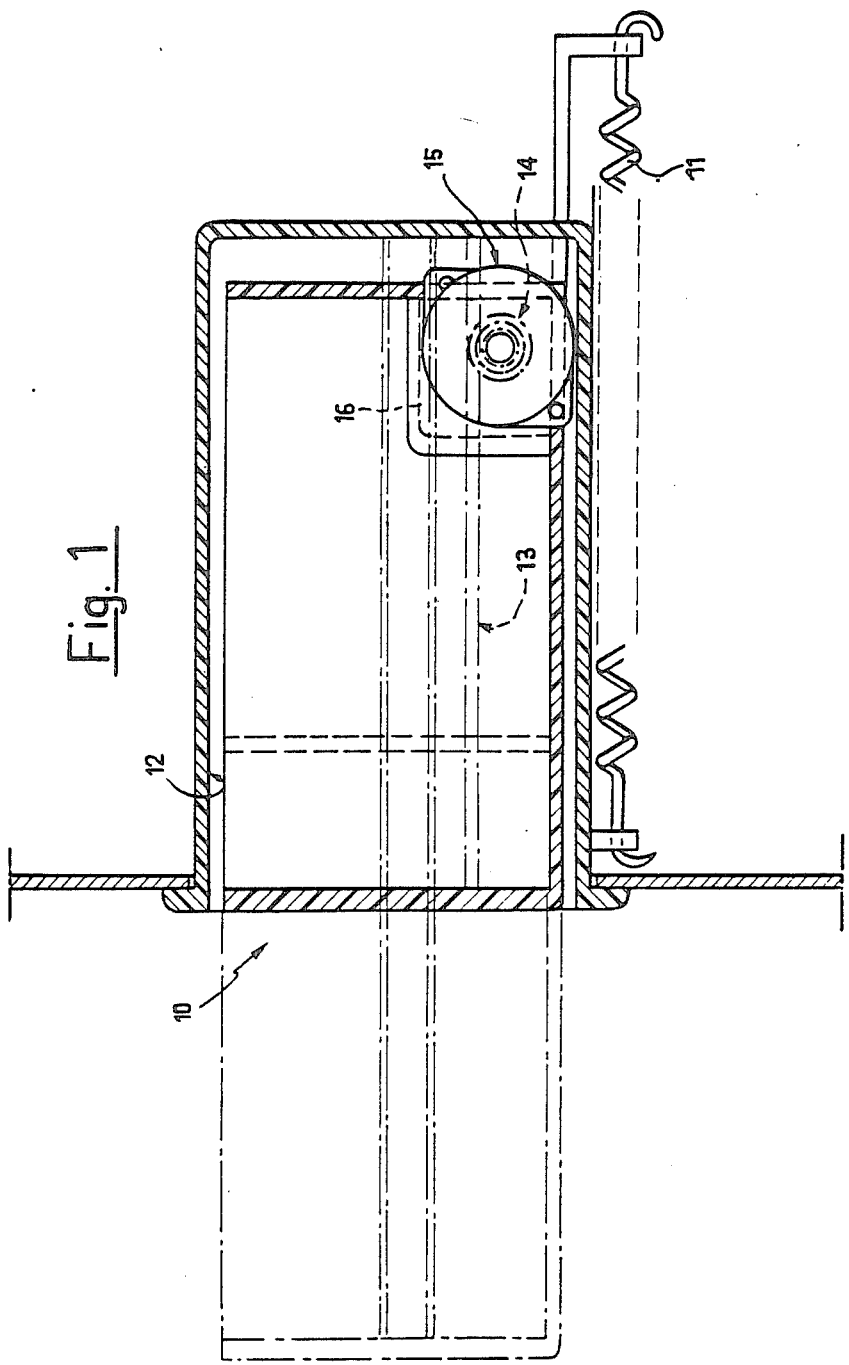

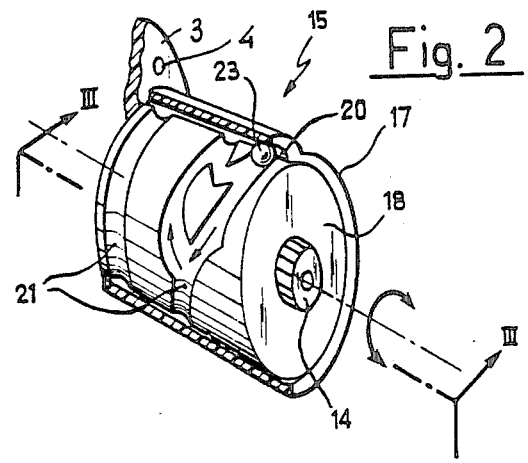
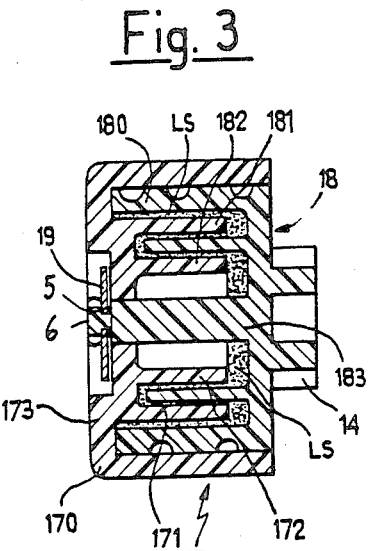
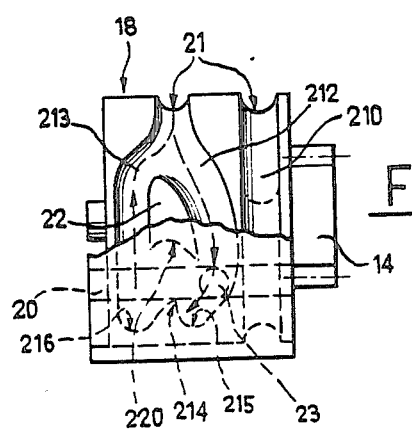
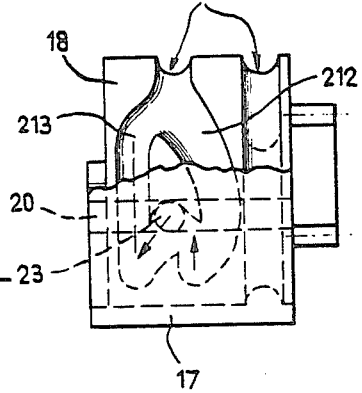
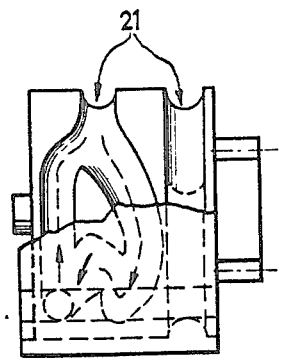
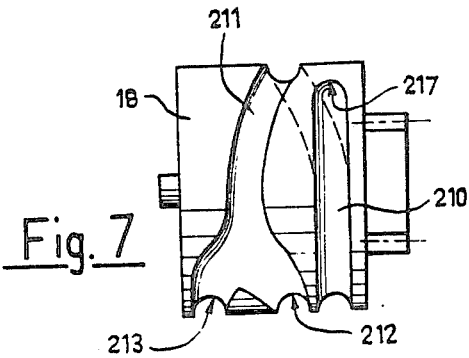

4,694,530

DEVICE FOR CONTROLLING OPENING AND CLOSING OF MOVABLE OBJECTS, IN PARTICULAR DOORS AND DRAWERS IN MOTOR VEHICLES, HAVING MUTUALLY COOPERATING STATOR AND ROTOR

BACKGROUND OF THE INVENTION

This invention relates to a device for controlling opening and closing of movable objects, in particular doors and drawers in motor vehicles, having mutually cooperating stator and rotor.

It is known to subject doors and drawers in general to the action of elastic means in order to provide controlled opening thereof. Such opening arrangements find convenient application for instance, in motor vehicles because they make the operation of opening ashtrays, drawers, paper bins, and the like easier to perform. However the biasing action of the elastic means must be suitably slowed down or dampened in order that the opening action does not occur with a snap action or too rapidly; this to prevent objects, in the instance of paper holding drawers, and ash and cigarette butts in the instance of ashtrays, from being thrown out.

It is also known to provide such drawers and ashtrays with mechanisms for holding them shut which are releasable on the mere exertion of a pressure on the door or drawer, thereby both the closing operation and the releasing operation for opening purposes can be effected by pushing on said door or ashtray; such holding mechanisms are referred to by the skilled artisan as "push-push" systems.

Drawers and ashtrays subjected to elastic opening means are currently provided with mutually independent slowing down means and holding means, thereby the structure as a whole is made complicated, expensive, and occasionally unreliable in operation.

Furthermore, the holding mechanism of the type specified above, where adopted, are dedicated, that is formed as an integral part of the ashtray, or drawer, wherefor they are intended, in the sense that at least most of the members of which they are composed are molded in, or permanently secured to, the structure of the drawer or ashtray.

This makes the mechanism unusable for other applications and involves the use of complicated and expensive molds.

SUMMARY OF THE INVENTION

Accordingly, it is an aim of this invention to obviate such drawbacks, and to provide a device adapted for controlling doors, drawers etc. which can perform the dual function of slowing down and holding drawers, doors and the like openable members, with pressure release.

Within the above aim, it is an object of the invention to provide a device for controlling doors and drawers subjected to elastic means.

This aim and this and other objects which will become apparent hereinafter are achieved by a device for controlling doors, drawers and the like movable members which is characterized in that it comprises a stator and a rotor, wherebetween a high density fluid is interposed, and a mechanism for controlling relative motion of said stator and rotor, said means being engageable and disengageable through angular displacements of the rotor relatively to the stator.

According to one aspect of the invention the rotor is provided with a sprocket adapted to mesh with a rack which moves relatively to the device as the door or drawer is moved such that the succession of the rotor angular displacements causing the holding mechanism to be engaged or disengaged take place through an action of pressure and release on said drawer or door.

BRIEF DESCRIPTION OF THE DRAWINGS

The invention will be now described in detail with reference to the accompanying illustrative, nonlimitative drawings, wherein:

FIG. 1 is a longitudinal section through a motor vehicle ashtray incorporating the device for controlling doors, drawers and the like movable members according to the invention;

FIG. 2 is a perspective view of the device according to the invention with the stator partly sectioned;

FIG. 3 is a longitudinal section taken along the line III—III of FIG. 2;

FIGS. 4, 5 and 6 are elevation views of the device, partly in section, illustrating the mode of operation of the holding and releasing mechanism; and FIG. 7 is an elevation view of the rotor.

DESCRIPTION OF THE PREFERRED EMBODIMENTS

With reference to the above cited drawing figures, the reference numeral 10 designates the linearly sliding drawer of an ashtray for motor vehicles, and 11 a coil spring biasing the drawer to the open position thereof. The drawer 10 is guided, in a manner known per se within a housing compartment 12 on a sidewall whereof is a fixed rack 13 with which a sprocket 14 of the slowing down and holding device, generally designated 15, is arranged to mesh.

That device is housed in a compartment 16 of the drawer whereto it is removably secured, for instance, by means of rivets or the like fixing means.

The device 15 is substantially composed of a bell-like stator 17, having a plurality of concentric cylinders 170-171-172, and including a flange 3 advantageously having through holes 4 formed therein, for accommodating fixing means such as rivets, screws, bolts or the like fixing means for rigidly associating the flange 3 with the sidewall of the drawer with the sprocket 14 in mesh engagement with the rack 13, said device also including a rotor 18 also provided with a plurality of concentric cylinders 180-181-182 interposed between the cylinders 170-171-172 of the stator 17 (FIG. 3). Between the cylinders of the rotor and the stator, there is expediently interposed a high density fluid which may be composed of a lubricant of the type known as a solid lubricant LS, such as, for example, graphite or molybdenum disulphide, adapted to control or slow down the relative rotary motion between the stator and the rotor. The rotor 18 is also provided with a central pin 183, which has an annular groove 5 formed proximately to the extremity 6 thereof and passes in rotary relationship through a corresponding hole formed in the base 173 of the stator. The stator 17 is expediently limited in its axial displacement by a spring washer or circlip 19 adapted for engagement with the annular groove 5. Instead of utilizing a spring washer and annular groove, the end portion 5 of the pin 183 may be threaded for screw thread engagement with a nut or internally threaded ring, to retain a washer in position on the end portion 5 and thereby delimit the axial displacement of the stator 173 on the pin 183. Obviously, other alternative means such as a locking pin or lock nut arrangement could also be employed.

On the inner cylindrical surface of the stator body of bell-like shape there is provided a straight groove 20 extending parallel to the generatrix lines of the body itself. On the outer surface of the rotor body, there is correspondingly provided a continuous groove 21 of a substantially helical pattern, both grooves being profiled in cross section to substantially define an arc of a circle.

More particularly, and as clearly shown in FIGS. 4 and 7, the groove 21 comprises a first semi-annular portion 210 extending substantially perpendicular to the generatrices of the rotor, an intermediate portion 211 of helical connection, and a second ring-like portion characterized by two groove portions or path legs 212-213, respectively forward and back ones, whereto a cam 22 is interposed. As visible, the groove portions or path legs 212-213 are arranged in parallel to each other and have a first common end connected to the intermediate portion or section 211 and a second common end opposite thereto. Formed on the cam is a central notch 220 in front of which is a cusp 214 interconnecting the two legs 212-213 of the groove at the second common end thereof.

The cusp connection 214 delimits two notches 215-216 substantially confronting the notch 220 of the cam 22. Between the grooves 20 and 21 there is interposed a small substantially spherical element or ball 23 which moves axially along the groove 20 by virtue of the dynamic forces imparted thereto by the walls of the groove 21 as the rotor 18 is rotated relatively to the stator 17. Upon moving along the groove 20, the ball, by engaging successively with the legs 212-213 of the groove 21, effects the rotor holding and releasing in conformity with the sought procedures of the so-called "push-push" systems.

The sequence of FIGS. 4 to 6 shows such procedures for holding and releasing. From those figures, it may be seen that:

(a) the ball 23, after being engaged by the portions 210-211 of the groove, is diverted by the cam 22 into the leg 212 and engages in the notch 215 stopping the rotor 17 from turning;

(b) from this position, by turning the rotor shortly in the opposite direction, by virtue of the cusps delimiting the central notch 220 of the cam 22, the ball 23 reaches the central notch to again stop the rotor (position where the drawer is held closed, FIG. 5);

(c) on turning the rotor 18 through a short angular distance in the same direction of rotation as under (a) above, the ball is diverted from the cusp connection 214 into the notch 216, to again stop the rotor;

(d) on turning now the rotor in the opposite direction, the ball engages with the return path leg 213 and then with the helical connection 211 and the portion 210 as far as the travel end notch 217.

The step (a) occurs when the drawer is pushed closed; step (b) occurs on releasing the drawer by virtue of the opening spring; step (c) is consequent to the push that is exerted on the drawer for releasing purposes; step (d) corresponds to the drawer opening.

Of course, the device according to the invention may be modified or adapted in various ways without departing however, from the purview of the instant inventive concept.

For example the rack 13, instead of being fixed on the sidewall of the compartment 12, may be alternatively fixed to the side of the drawer 10, and the stator 17 fixed to the compartment 12 sidewall such that the sprocket 14 engages with the rack 13.

In particular, if required for reasons of space, the spring which biases the drawer (or door) open may be incorporated to the device itself, in which case it will be configured coil-like and interposed to the stator 17 and the rotor 18.

Further, if the door opening is of the hinge type, instead of the linearly sliding type, then the rack 13 will be configured in the form of an arc of a circle with its center of curvature on the hinge axis.

Furthermore, any of the elements of the device according to the invention may be substituted by technically equivalent elements. For example the rack 13 and sprocket 14 could be replaced by a guide, and a roller frictionally engaging therewith.

I claim:

1. A device for controlling opening and closing of movable objects, in particular doors and drawers in motor vehicles, comprising a stator; a rotor rotatable and effecting angular displacements relatively to said stator, said stator being a bell-like stator with stator concentric cylinders and said rotor having rotor concentric cylinders interposed between said stator concentric cylinders; a straight groove formed on one of said stator concentric cylinders; a profiled groove formed on one of said rotor concentric cylinders and partially facing said straight groove, said profiled groove forming at least first and second groove portions arranged in parallel to each other and having first and second common ends; a cam formed on said one of said rotor concentric cylinders between said first and second groove portions; a high density fluid defining solid lubricant interposed between said stator and rotor concentric cylinders; locking and releasing means for controlling relative motion of said stator and rotor and being engageable and disengageable through said angular displacements of said rotor relatively to said stator, said locking and releasing means including a ball engaged in said straight groove of said stator and being biased by said profiled groove in said rotor, said first and second groove portion respectively defining a forward and a return path for said ball.

2. A device according to claim 1, wherein said one of said stator and said one of said rotor concentric cylinders define generatrices, said straight groove extending parallel to said generatrices of said one of said stator concentric cylinders and said profiled groove further comprises a semiannular section extending perpendicularly to said generatrices of said one of said rotor concentric cylinders, an intermediate helical-shaped section connected to said semiannular section, and a ring-like section formed by said first and second groove portions, with said first common end of said first and second groove portions being connected to said intermediate section.

3. A device according to claim 1, wherein said cam comprises a central notch, and said first and second groove portions, at said second common end, define a cusp formation formed in said one of said rotor concentric cylinders in front of said central notch.

4. A device according to claim 3, wherein said first and second groove portions, at said second common end, define each a groove notch, said groove notches of said first and second groove portions being arranged side-by-side with said central notch extending between said groove notches.

* * * * *